OR 3,769,579

United States Patent [19]

Harney

[11] 3,769,579
[45] Oct. 30, 1973

[54] CABLE TELEVISION MONITORING SYSTEM

[75] Inventor: Ralph Harney, Wonder Lake, Ill.

[73] Assignee: Oak Electro/Netics Corporation, Crystal Lake, Ill.

[22] Filed: Mar. 31, 1972

[21] Appl. No.: 239,996

[52] U.S. Cl............. 325/31, 178/DIG. 13, 325/308, 340/151
[51] Int. Cl......... H04b 3/02, G04n 7/18, H04q 5/16
[58] Field of Search................ 178/DIG. 13; 325/31, 325/308; 340/151

[56] References Cited

UNITED STATES PATENTS 3,396,232 8/1968 Hendrickson........................ 325/31
3,703,684 11/1972 McVoy........................ 178/DIG. 13
3,492,577 1/1970 Reiter.................................. 325/31

*Primary Examiner*—Howard W. Britton
*Attorney*—Howard T. Markey et al.

[57] ABSTRACT

A system for interrogating TV receivers connected to a common distribution system, for example a cable or the like, in which a start signal activates transponders at each of the TV receivers and a series of clock signals, transmitted during the vertical blanking interval of the TV signal, are used to determine the reply periods of the transponders.

10 Claims, 4 Drawing Figures

PATENTED OCT 30 1973

3,769,579

SHEET 1 OF 2

NORMAL T.V. VIDEO WAVEFORM AFTER DETECTION

T.V. VIDEO WAVEFORM WITH THE COUNTER START SIGNAL ADDED

CABLE TELEVISION MONITORING SYSTEM

SUMMARY OF THE INVENTION

The present invention relates to a method for determining what TV receivers in a common distribution system are watching particular programming.

A primary purpose of the invention is a method of interrogating TV receivers connected to a common distribution system in which the periods for reply are determined by clock signals sent out to the transponders at each subscriber location during vertical blanking intervals of the TV signal.

Another purpose is a method of interrogating a plurality of TV receivers in which the interrogating signal and the subsequent clock signals are transmitted during the vertical blanking intervals of the TV signal.

Another purpose is a system of the type described utilizing the horizontal and vertical sync pulses of the TV program to control the reply of the subscriber transponders.

Another purpose is a reliably operable simple constructed TV subscriber interrogation system.

Another purpose is a system for interrogating TV receivers which can provide several different types of responses.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

The present invention is directed to a means for determining which TV receivers in a cable distribution system are watching a particular program. The invention also has application in audience surveys. The information received at the central station or distribution center is such that it can be automatically fed to a computer for billing purposes so that each subscriber will be billed in accordance with his use of the TV programming supplied.

Basically each TV receiver has a transponder, which may be of the "set top" type. The transponders are all interrogated by a common start signal. Following the start signal there is a series of clock pulses or clock signals which control the replies of the various transponders. The transponders reply in groups, for example in groups of 100, utilizing a 100-channel receiver at the distribution center and 100 different assigned frequencies. All of the frequencies will be clearly outside of the TV spectrum so that there will be no interference. The periods of reply are sequential, with the periods being controlled by the clock signals so that there will be subsequent groups of 100 receivers replying during predetermined intervals.

The start signal may be initiated in a number of different ways. A portion of the audio being transmitted on the cable, or a portion of the video signal may be used. Or the start signal may be a combination of the audio and video signals. In the described application, the start signal makes use of the horizontal sync pulses of the TV signal. The replies from each of the interrogated transponders will take place in the periods between vertical blanking intervals.

Figure 1A:
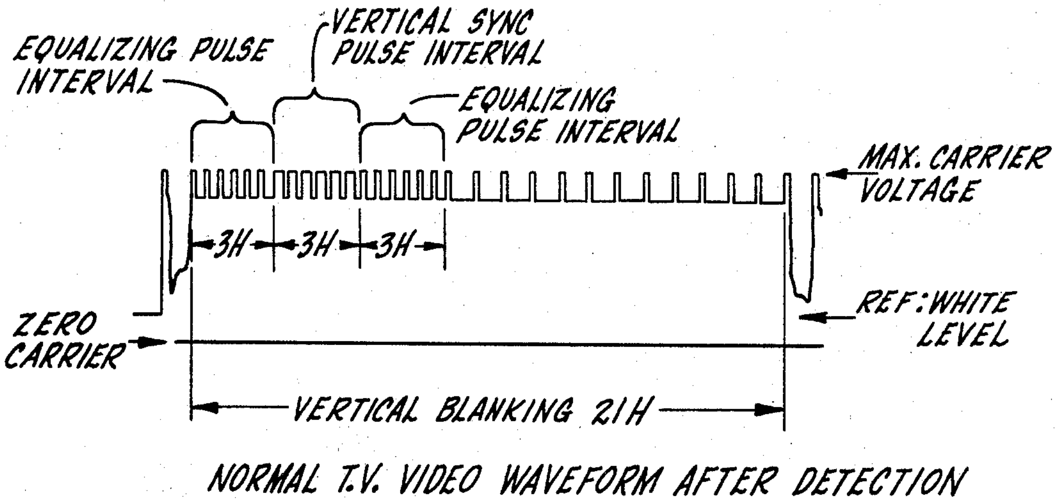
FIGS. 1A and 1B are diagrammatic illustrations of the start signals used in the present interrogation system.
Figure 1B:
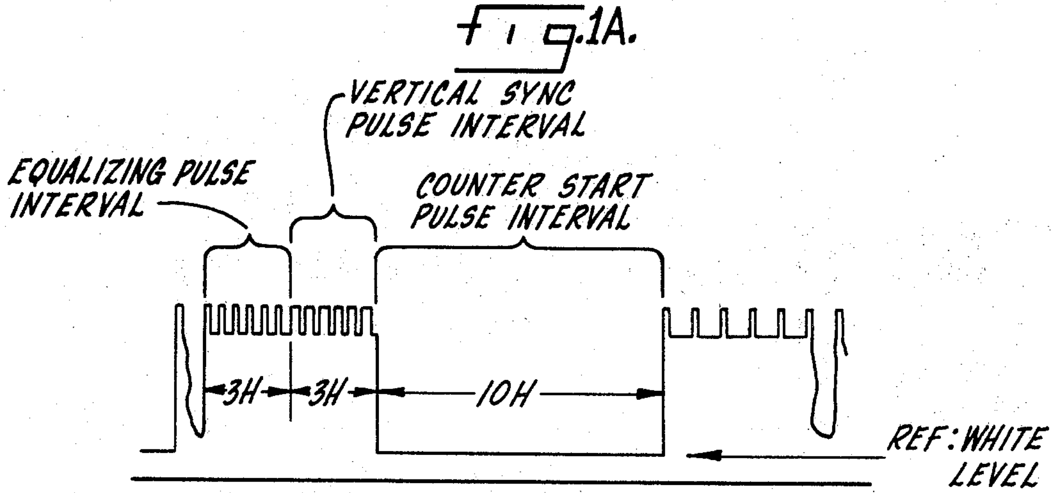

In FIG. 1 the top diagram shows the vertical blanking interval of a conventional TV signal which normally consists of 21 horizontal lines. The lower diagram shows the conventional TV signal with the start signal added. As shown, there is no use of the vertical blanking interval during the first three horizontal lines. The next three horizontal lines are utilized by the vertical sync pulse. Following the vertical sync pulse for a period of 10 horizontal lines, the video output will be held near the reference white level. The absence of the horizontal sync pulses for a period of 10 horizontal lines is the effective start signal or interrogation signal to initiate the reply of all of the transponders as described below.

Figure 2:
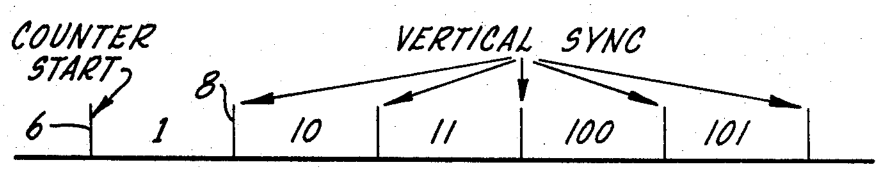
FIG. 2 is a diagrammatic illustration of the answering periods.

The replies of the various transponders will be in accordance with the arrangement of FIG. 2. The counter start signal, which is the absence of horizontal sync for at least 10 horizontal lines, is indicated at 6. Following the counter start signal are a plurality of vertical sync pulses indicated at 8. In the intervals between the vertical sync pulses, which are in effect clock pusles determining the periods of reply, groups of transponders will send replies back to the distribution center. There may be a binary system for coding the various transponders. Again, there may be 100 transponders, as an example, replying during each of the periods. All of the transponders having the code 1 would reply during the first period, transponders having the code 1 0 would reply during the second period, etc. Thus, in a one-minute period and assuming 100 transponders replying during the interval between vertical sync pulses, 360,000 subscribers can be interrogated.

Figure 3:
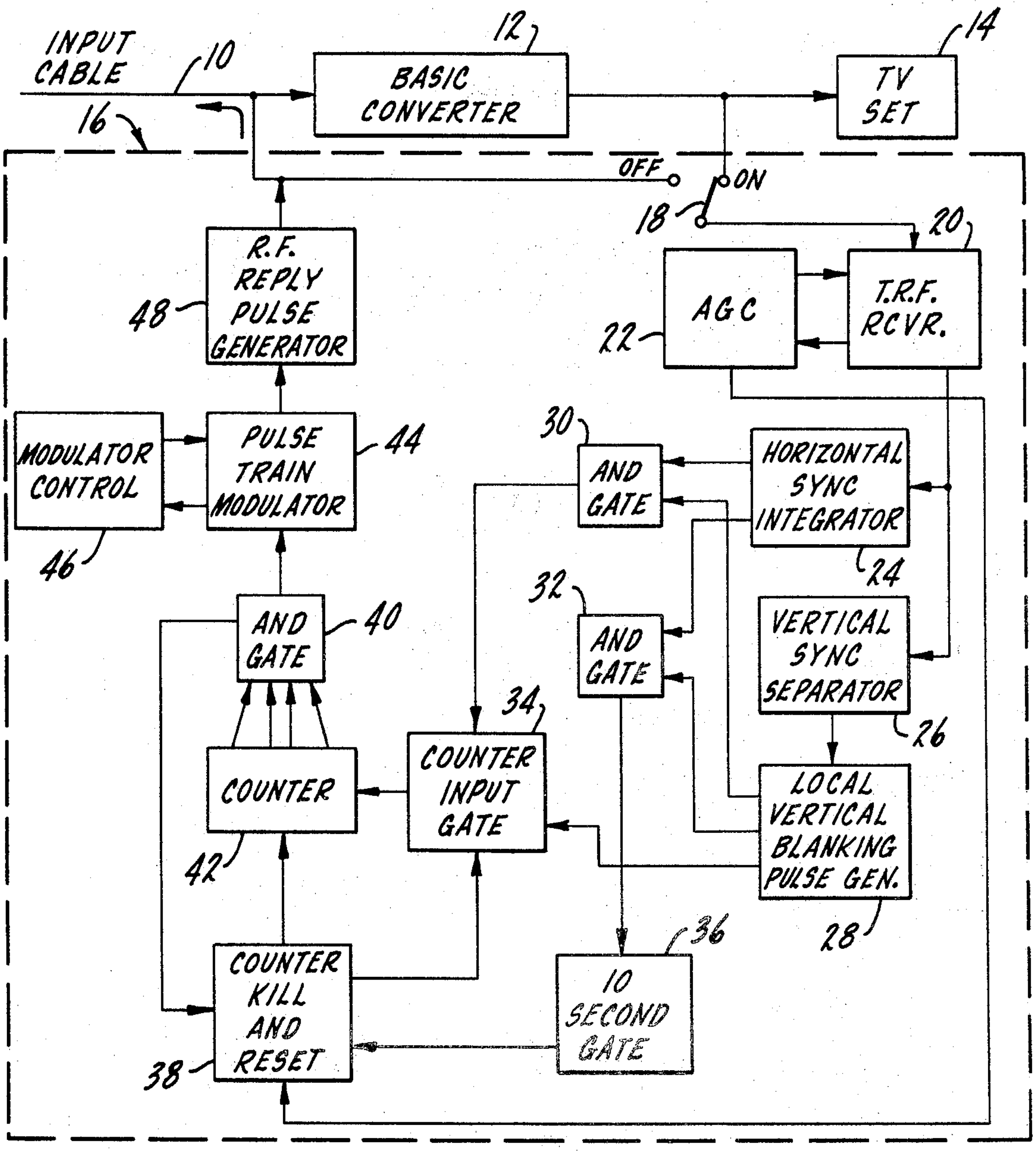
FIG. 3 is a block diagram of the transponder used in the method and system described herein.

In FIG. 3 the input cable from the distribution system is indicated at 10 and is connected to a cable television converter 12. The converter accepts a multiplicity of TV channel signals at its input and selectively converts them to a single TV channel at the output. A selector knob on the converter selects the incoming channel to be viewed and the converter output is always the same frequency, for instance TV Channel 3. The output of the converter 12 goes to the TV set 14. The transponder is indicated at 16. There is an on-off switch 18 which is the power switch for the converter and is used to effect a transponder bypass during periods when the converter is not used so that even though a particular TV set is not operating, the transponder may still be interrogated, for example as a system check. Switch 18 may also be ganged to the converter channel selector, so that audience polling is only possible on certain predetermined channels. The output of the converter 12 is connected through the switch 18 to a tuned radio frequency receiver 20 which is tuned to the output channel of the converter. Use of a T.R.F. receiver is advantageous, since it has no local oscillator, thus avoiding any possible interference with the TV signal.

One output from the receiver 20 goes to an automatic gain control 22 with the AGC having an output going back to the receiver 20. Thus, the output from the receiver 20 has a constant level.

The output of the receiver 20 is connected to a horizontal sync integrator 24 and to a vertical sync separator 26. A local vertical blanking pulse generator 28 is connected to the vertical sync separator 26. A pair of "and" gates are indicated at 30 and 32. "And" gate 30 receives an input from the horizontal sync integrator 24 and from the local vertical blanking pulse generator 28. "And" gate 32 receives an input from the horizontal sync integrator 24 and also from the local vertical blanking pulse generator 28.

A counter input gate is indicated at 34 and a 10-second gate is indicated at 36. The 10-second gate 36 is connected to gate 32 with the counter input gate 34 being connected to gate 30. A counter kill and reset circuit is indicated at 38 and receives inputs from 10-second gate 36, the AGC 22 and from an "and" gate 40. The output from the counter kill and reset circuit 38 goes to a counter 42, as does the output from gate 34. The output from the counter 42 goes to "and" gate 40. "And" gate 40 in turn is connected to a pulse train modulator 44 controlled by a modulator control 46 with the output from the pulse train modulator 44 going to an RF reply pulse generator 48. The RF reply pulse generator 48 in turn is connected to the cable 10 so as to send a reply back to the distrubution center.

In operation, as indicated above, the start signal is preferably the absence of horizontal sync pulses for a period of 10 horizontal lines. The horizontal sync integrator 24 normally stretches a horizontal sync pulse so that it maintains its level during the period of each horizontal line. An absence of signal for a period of at least five horizontal lines causes a decay in the integrator level which provides an output from integrator 24 to gate 30. The vertical sync pulses, which are part of the TV signal, are used to control the operation of the local vertical blanking pulse generator 28. The local blanking pulse generator 28 has an output pulse width of about 15 horizontal lines, and is triggered by the received vertical sync pulse. The simultaneous presence of an output from the pulse generator 28 and a signal from the horizontal sync integrator 24 will cause "and" gate 30 to send an "on" signal to the counter input gate 34. Thus, the clock pulses from the local pulse generator 28 can then be directed through gate 34 to the counter 42. The pulses will be counted in counter 42 and after a predetermined number have been received, which number will be set in accordance with the period of response of the particular transponder, "and" gate 40 will cause the pulse train modulator 44, controlled by the modulator control 46, to provide a reply pulse from the generator 48. At the same time as "and" gate 40 causes the reply signal to be sent back to the distribution center, it will initiate operation of the reset circuit 38 which will turn the counter off.

Thus, after a predetermined number of clock pulses have been received by the counter, following a start signal, a reply will go back to the distribution center indicating the particular condition of the transponder. For example, if a particular program is being watched by the subscriber and the interrogation was on that channel, the reply would be to the effect that the subscriber was watching the programming on a particular channel.

To avoid the possibility of reply during a fluctuating or low level signal, the reset circuit 38 will be operated any time the incoming signal level falls below a predetermined point, as determined by the automatic gain control circuit 22.

Transient conditions may occur in a system that generates a signal resembling an interrogation signal. If the source of a TV signal is a receiving antenna at the distribution center, a momentary signal fade could provide an absence of several consecutive horizontal sync pulses. Protection against replies being generated by unreliable fluctuating signals is provided as follows: The horizontal sync integrator 24 provides an input to gate 32 in the absence of five or more consecutive horizontal sync pulses. The local blanking pulse generator 28 provides an input to gate 32 in the absence of a local blanking pulse. Thus gate 32 provides an output if a "false" interrogration, not coincident with a local blanking pulse, is received. The output of gate 32 drives the ten second gate 36 which drives the counter kill and reset 28 so that the transponder is inoperative for 10 seconds after receiving a false interrogation. Switching the converter channel selector should provide a momentary absence of horizontal sync pulses and also activate the above false interrogation protection circuitry.

Normally, the reply will be merely an indication of "I am watching this channel" which will be a single pulse from the RF pulse generator 48. However, in some situations, such as audience surveys, additional information may be required. The pulse train modulator 44 can provide a six-pulse train. The first pulse would be fixed, indicating that a particular channel is being watched, with the optional pulses being used in different manners to set up as many as 31 different replies. Various switches or a keyboard can be arranged at the transponder so that a subscriber may code his reply back to the distribution center.

Of importance in the invention is the fact that the TV signal itself is used as a vehicle for sending the start signal and the clock signals. The transponders reply in groups and in sequence The clock signals control the period of reply of each transponder and preferably the clock signals are effected by the vertical sync sent out during the vertical blanking interval. In like manner, it is preferred that an absence of horizontal sync for a period not less than 10 horizontal lines during the vertical blanking interval be used as the start signal. Other forms of start signals, however, may be satisfactory.

The system includes a number of safeguards against false replies. Thus, in order to initiate a reply, the following conditions must be present: a TV signal above a predetermined level (AGC sensing); vertical sync must be present; and the interrogation signal should occur during the vertical blanking interval and be of a predetermined duration.

Whereas the preferred form of the invention has been shown and described herein, it should be realized that there may be many modifications, substitutions and alterations thereto.

I claim:

1. A method of interrogating a plurality of TV receivers connected to a common program distribution system, with each receiver having a transponder for signaling a common location, including the steps of:

sending a start signal to a plurality of transponders over the distribution system, with the start signal providing no interruption to the TV programming and being unique in character, sending a series of clock signals during subsequent vertical blanking intervals of the TV signal, groups of transponders replying to the start signal between subsequent vertical blanking intervals as determined by the number of clock signals received by the individual transponders.

2. The method of claim 1 further characterized in that the start signal is sent during the vertical blanking interval of the TV signal.

3. The method of claim 1 further characterized by the step of generating independent clock signals at each of the transponders, said clock signals being generated in response to received vertical sync signals during the vertical blanking intervals.

4. The method of claim 1 further characterized by and including the step of coding the transponder reply to provide different types of information.

5. The method of claim 1 further characterized in that all of said transponders receive the initial start signal, with said transponders replying in predetermined groups, with all the transponders in each group replying after a given number of clock signals.

6. The method of claim 1 further characterized by the step of cancelling an interrogration at a transponder if the TV channel is changed after the interrogation and prior to reply.

7. The method of claim 1 further characterized by the step of preventing a reply from an interrogated transponder if the TV signal is not at a predetermined level.

8. The method of claim 1 further characterized by the step of preventing a reply from an interrogated transponder if there is an absence of vertical sync pulses in the TV signal.

9. The method of claim 1 further characterized in that the start signal consists of an absence of horizontal sync pulses for a predetermined period.

10. The method of claim 9 further characterized in that the start signal takes place during the vertical blanking interval.

* * * * *